United States Patent
Hokanson

(10) Patent No.: US 8,533,183 B2
(45) Date of Patent: Sep. 10, 2013

(54) OPTIMIZING ACCESS TIME OF FILES STORED ON STORAGES

(75) Inventor: Mark K. Hokanson, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/203,978

(22) PCT Filed: Mar. 10, 2009

(86) PCT No.: PCT/US2009/036675
§ 371 (c)(1),
(2), (4) Date: Aug. 30, 2011

(87) PCT Pub. No.: WO2010/104505
PCT Pub. Date: Sep. 16, 2010

(65) Prior Publication Data
US 2011/0320436 A1    Dec. 29, 2011

(51) Int. Cl.
*G06F 17/30* (2006.01)
(52) U.S. Cl.
USPC .......................................................... 707/719
(58) Field of Classification Search
USPC .................. 711/117, 165; 707/698, 705
See application file for complete search history.

(56) References Cited

U.S. PATENT DOCUMENTS

| 6,032,224 | A | * | 2/2000 | Blumenau | 711/117 |
| 6,148,294 | A | * | 11/2000 | Beyda et al. | 1/1 |
| 2001/0013087 | A1 | | 8/2001 | Ronstrom | |
| 2005/0044104 | A1 | | 2/2005 | Kaneda | |
| 2006/0136668 | A1 | | 6/2006 | Rudelic | |
| 2007/0136308 | A1 | | 6/2007 | Tsirigotis et al. | |
| 2008/0027905 | A1 | * | 1/2008 | Jensen et al. | 707/2 |
| 2008/0059718 | A1 | * | 3/2008 | Tajima et al. | 711/148 |
| 2008/0288714 | A1 | * | 11/2008 | Salomon et al. | 711/103 |
| 2009/0132621 | A1 | * | 5/2009 | Jensen et al. | 707/205 |
| 2009/0265506 | A1 | * | 10/2009 | Yim | 711/103 |

OTHER PUBLICATIONS

Role of Aging, Frequency, and Size in Web Cache Replacement Policies, by Ludmila Cherkasova and GianFranco Ciardo, HPCN Europe 2001, LNCS 2110, pp. 114-123, 2001.*
Hybrid solid-state disks: Combining heterogeneous NAND flash in large SSDs ,Li-Pin Chang ; Nat. Chiao-Tung Univ., Hsinchu, Design Automation Conference, 2008. ASPDAC 2008. Asia and South Pacific, Date of Conference: Mar. 21-24, 2008, pp. 428-433.*
Role of Aging, Frequency, and Size in Web Cache Replacement Policies, Ludmila Cherkasova, Gianfranco Ciardo, Published in: Proceeding HPCN Europe 2001 Proceedings of the 9th International Conference on High-Performance Computing and Networking, pp. 114-123, Springer-Verlag London, UK ©2001.*
ISA/KR, international Search Report dated Nov. 2 2009, PCT/US2009/036675 filed Mar. 10, 2009.

* cited by examiner

*Primary Examiner* — Kimberly Wilson
*Assistant Examiner* — Hau H Hoang

(57) ABSTRACT

When each file of a number of files is accessed, at least a number of times each file has been accessed is kept track of. Each file is stored on a storage of a number of storages. Periodically, at least one file is moved among the number of storages, based at least on the number of times each file has been accessed. As such, the at least one file is moved from being stored on a first storage to being stored on a second storage, to optimize subsequent access time of the at least one file. The storages are physically distinct storage devices. At least one of the storage devices has different storage characteristics as compared to one or more other of the storage devices.

15 Claims, 3 Drawing Sheets

| ID | NAME | CAPACITY | SEQ READ SPEED | SEQ WRITE SPEED | RANDOM READ SPEED | RANDOM WRITE SPEED |
|---|---|---|---|---|---|---|
|  |  |  |  |  |  |  |
|  |  |  |  |  |  |  |
| ⋮ | ⋮ | ⋮ | ⋮ | ⋮ | ⋮ | ⋮ |
|  |  |  |  |  |  |  |

FIG. 2A

| ID | NAME | SIZE | READ COUNT | WRITE COUNT |
|---|---|---|---|---|
|  |  |  |  |  |
|  |  |  |  |  |
| ⋮ | ⋮ | ⋮ | ⋮ | ⋮ |
|  |  |  |  |  |

FIG. 2B

| TOTAL ACCESS COUNT | STORAGE DEVICE ID |
|---|---|
| A |  |
| B |  |
|  |  |
| L |  |

FIG. 2C

OPTIMIZING ACCESS TIME OF FILES STORED ON STORAGES

BACKGROUND

A file in the context of a computing environment is a collection of computer-readable data that is representative of one or more different things. For example, a file may be a word processing file representing text that can be viewed and edited using a word processing computer program. As another example, a file may be a spreadsheet file representing a spreadsheet that can be viewed and edited using a spreadsheet computer program. As a third example, a file may be a computer program file representing a computer program that can be executed or run. Files are stored on storage devices, such as hard disk drives.

BRIEF DESCRIPTION OF THE DRAWINGS

FIGS. 2A, 2B, and 2C are diagrams of tables that can be employed in implementing parts of the method of FIG. 1, according to an embodiment of the present disclosure.

DETAILED DESCRIPTION

Figure 1:
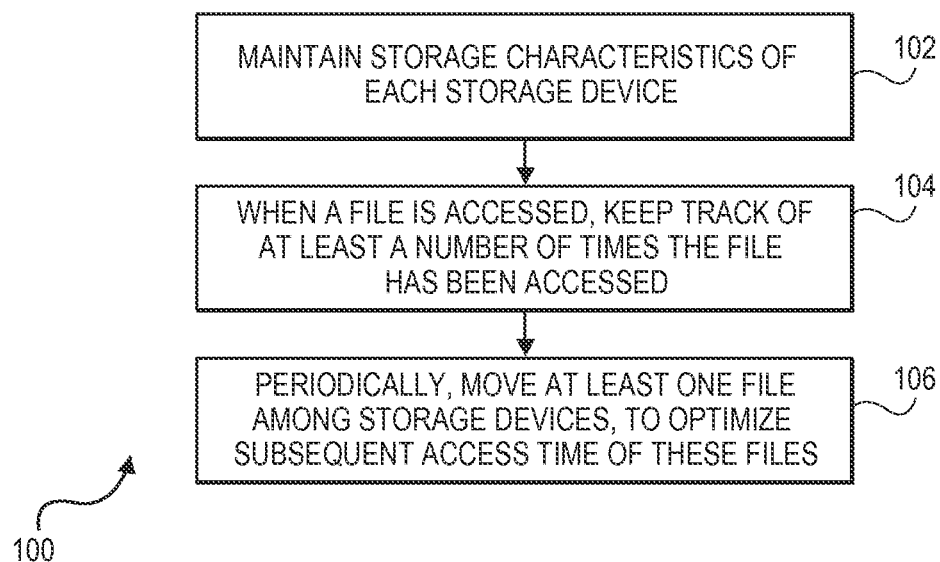
FIG. 1 is a flowchart of a method to optimize access times of files stored on storage devices and to optimize overall system performance, according to an embodiment of the present disclosure.

Statement of Problem and Overview of Solution

A file in the context of a computing environment has a home location. The home location specifies the non-volatile storage device on which the file is to be stored indefinitely, until manually moved by a user to another storage device or until the file has been deleted. Typically, when a file is initially created, its home location—i.e., the non-volatile storage device on which the is to be stored indefinitely—is specified. After this time, a computing device accesses the from this location.

It is noted that some types of computing devices can cache a the where the is more easily accessible, such as copying the temporarily from a hard disk drive to a volatile semiconductor random-access memory, but such movement is only temporary, and the home location is not changed. It is further noted that utility computer programs known as defragmenters can optimize how the files of a particular storage device, such as a particular hard disk drive, are actually stored on this particular storage device. However, defragmenters do not move files from one storage device to another storage device.

One inventive insight provided by the inventor of the present disclosure is that, given the wide variety of different storage devices that a modern computing device may have at its disposal, files can be moved among these different storage devices so that they are stored on the storage devices that provide for optimal or near optimal access times of often-accessed files. That is, the storage device on which a given file is initially stored may not be the optimal storage device for improving access time of the and thus for improving system performance as a whole. Rather, the inventor has inventively determined that files should be periodically moved among the different storage devices available to a computing device, to ensure optimal file access time.

Periodically moving files among the different storage devices a computing device has at its disposal means that the home locations of the files are changed. Such movement is not just a simple caching of the files on quicker storage devices, in other words. The access time of a file is the length of time it takes for a computing device to access—such as read or write—the file. The access time of a file largely depends on the storage characteristics of storage device on which the file is stored. Such storage characteristics include sequential access speed as well as random-access speed. Sequential access speed refers to the speed at which data can be retrieved from a storage device where the data is sequentially stored on the device, and can also be referred to as sustained throughput speed. By comparison, random-access speed refers to the speed at which data is initially located on the storage device, and can also be referred to as seek time speed.

Different types of storage devices have different storage characteristics. A modern hard disk drive that locally resides within a computing device, for example, usually has relatively fast sequential access speed, but relatively slow random-access speed. By comparison, a flash drive, which is a non-volatile semiconductor storage device, usually has relatively fast random-access speed but relatively slow sequential access speed as compared to the fastest modern hard disk drive. A network drive, which is usually a hard disk drive that is remotely accessible by a computing device over a network, by comparison typically has the slowest sequential access speed as well as the slowest random-access speed. In terms of storage space, a local hard disk drive typically has more storage space than a flash drive, and a network drive typically has more storage space than a local hard disk drive.

Therefore, embodiments of the present disclosure periodically move files among the different storage devices available to a computing device to optimize access time of the files and to optimize overall system performance. Generally, files that are accessed the most are moved so that their home locations are changed from a slower storage device to a faster storage device. Smaller often-accessed files may be moved to flash drives, which provide for relatively fast random-access speeds. Larger often-accessed files may be moved to local hard disk drives, which provide for relatively fast sequential speeds. Files not accessed often may be moved to local hard disk drives, or even to network drives. The net result is that system performance is improved, because often-accessed files are stored at and thus accessed from faster storage devices.

The problem faced by the inventor, in other words, was how to improve system performance without necessarily improving the individual hardware components of a given computing device. The easy way to improve system performance is to simply switch out existing hardware components of a computing device for faster ones. An existing processor may be replaced by a faster processor, an existing hard disk drive may be replaced by a faster hard disk drive, and so on. However, replacing existing components of a computing device with faster components is a costly endeavor, and many times is difficult to justify in large-scale, enterprise environments. As such, the inventor's solution of moving files to storage devices such that overall system performance is improved is ingenuous. No new hardware is needed, such that the inventor's solution is more cost effective than replacing hardware components with faster counterparts.

Description of Various Embodiments of the Present Disclosure

FIG. 1 shows a method 100 to optimize access times of files stored on storage devices and thus to optimize overall performance of a computing device, according to an embodiment of the present disclosure. The method 100 may be implemented by a computer program stored on a computer-readable medium, such as a tangible computer-readable medium like a semiconductor or a magnetic data storage medium, and executed by one or more processors of a computing device, such as a desktop or a laptop computer. In such instance, the execution of the computer program by the processors from the computer-readable medium causes the computer program to perform the method 100.

The method 100 maintains the storage characteristics of each storage device available to a computing device (102). For example, these storage characteristics can include, for each storage device, the sequential read speed of the storage device, the sequential write speed of the storage device, the random-access speed of the storage device, the sequential read speed of the storage device, as well as the size of the storage device. In one embodiment, the method 100 queries each storage device, and receives in response to this query the storage characteristics of the storage device from the storage device. In another embodiment, the method 100 tests each storage device to determine the storage characteristics itself. For example, the method 100 may write or read a very small file to or from a storage device to determine the write or read random-access speed of the storage device, and may write or read a very large file to or from a storage device to determine the write or read sequential-access speed of the storage device.

The sequential write speed of a storage device is the speed at which data can be written to a storage device, and can also be referred to as sustained write throughput speed. Similarly, the sequential read speed of a storage device is the speed at which data can be read from a storage device, and can also be referred to as sustained read throughput speed. For many types of storage devices, the sequential write speed is typically lower than the sequential read speed. The write random-access speed of a storage device is the speed at which data is initially located on the storage device for writing purposes, and the read random access speed is the speed at which data is initially located on the storage device for reading purposes. For many types of storage devices, the write and read random-access speeds are at least substantially identical, and can be referred to generally as seek time speed.

When a given file is accessed, the method 100 keeps track of at least the number of times this the has been accessed (104). Each of a number of files is stored on a given storage device of the storage devices available to the computing device in question. For example, the storage devices available to a computing device may include locally installed hard disk drives, which are referred to as local hard disk drives; locally installed flash drives, which are referred to as simply flash drives; and, network drives, which are typically hard disk drives and are accessible by the computing device over a network. The method 100 may also in part 104 keep track of other characteristics of the file as the file is accessed (i.e., as the file is read or written). These other characteristics can include the size of each file, as well as the specific number of times a file has been written and the number of times a file has been read. In this respect, it is noted that the number of times a file has been accessed is equal to the number of times the file has been written plus the number of times the file has been read.

In one embodiment, the method 100 may perform part 104 by relying upon operating system tracking functionality. For example, some types of operating systems may automatically track the number of times a file has been accessed. Such operating systems may include versions of the LINUX® operating system, where LINUX® is a trademark of Linus Torvalds. Such operation systems may further include versions of the Microsoft® Windows® operating system, which Microsoft® and Windows® are trademarks of Microsoft Corp., of Redmond, Wash.

In another embodiment, the method 100 may perform part 104 by detecting that a given file has been accessed, and in response to such detection, incrementing the number of times this file has been accessed. As such, there may be counters for the number of times a file has been read, and the number of times a file has been written. Detecting that a given file has been accessed may itself be performed in a number of different ways. For example, in one embodiment, executable-computer code may be inserted into the operating system, which is triggered when the operating system is caused to access a file, either by itself or by a computer program running in relation to the operating system. As another example, in another embodiment, executable-computer code may run at all times in the background, to detect when a file is accessed.

Furthermore, in one embodiment, the method 100 also tracks caching characteristics regarding each file in part 104. These caching characteristics can include, for instance, whether each file has been cached, whether each file is currently being cached, the number of times each file has been cached, and/or the length of time each file has been cached. A file is cached when it is temporarily copied from the non-volatile storage device on which it indefinitely resides (i.e., the file's home location) to another, faster storage device, such as a volatile storage device like dynamic random-access memory (DRAM), from which it is actually accessed while cached for improved system performance. At some point the changes to the cached version of the file are written back to the file as stored at its home location. The amount of cache space available within a given computing device is typically smaller than the amount of space on the storage devices that provide the home locations for files. As such, cached files may be periodically flushed from the cache to make room within the cache for other files.

Periodically, the method 100 moves at least one of the files among the storage devices, based at least on the number of times each file has been accessed, to optimize subsequent access times of these moved files, and thus to optimize overall system performance (106)—i.e., to optimize overall performance of the computing device itself. As such, for instance, a given file may be moved from being stored on a first storage device to being stored on a second storage device. This means that the home location of the given file changes, from the first storage device to the second storage device.

In various embodiments, movement of at least one of the files among the storage devices is further based on the storage characteristics of each storage device, the size of each file that has been accessed, the number of times each file has been specifically read from, and/or the number of times each file has been specifically written to. That is, one or more of these parameters are taken into account when determining which files should be moved from one storage device to another. In general, however, determining which files should be moved among the storage devices provides for optimizing overall system performance of the computing device, by optimizing subsequent access times of the files that are moved from their current storage devices to different storage devices.

For example, in one embodiment, the files that have been accessed the greatest number of times may be moved to one or more of the storage devices that have the fastest access speeds. As such, subsequent access of these files occurs more quickly, which improves system performance of the computing device as a whole. In this embodiment, the files that have been written to the greatest number of times may be moved to storage devices having the fastest (sequential and/or random-access) write speeds. Similarly, the files that have been read from the greatest number of times may be moved to storage devices having the fastest (sequential and/or random-access) read speeds.

As another example, in another embodiment, the files that have been accessed the greatest number of times may be moved to one or more of the storage devices that have the fastest access speeds, but where the sizes of the files and the sizes of the storage devices are also taken into account, so that no one file takes up all the storage space of a given storage device. For example, a ratio of the number of times a file has been accessed to the size of the file may be determined for each file. The files that have larger such ratios—corresponding to smaller files accessed frequently and larger files accessed even more frequently—may then be moved to storage devices having the fastest access speeds but which may have the smallest storage capacities. The files that have smaller such ratios—corresponding to larger files accessed frequently and smaller files accessed even less frequently—may then be moved to storage devices having relatively quick access speeds and that also have large storage capacities.

As a third example, in another embodiment, the smaller files that have been accessed the greatest number of times may be moved to one or more storage devices that have the fastest random-access speeds, and the larger files that have been accessed the greatest number of times may be moved to one or more storage devices that have the fastest sequential access speeds. This is because the smaller the file, the more the access time of the file depends on the initial seek time in locating the file on a given storage device. Similarly, this is because the larger the file, the more the access time of the file depends on the subsequent sustained throughput speed in reading the file from or writing the file to a given storage device.

As such, in general, embodiments of the present disclosure are not limited to particular optimization approaches as to how frequently accessed files should be moved among the storage devices. The examples provided in the preceding paragraphs may be modified, for instance, without deviating from the scope contemplated by the present disclosure. In general, then, frequently accessed files are moved among the storage devices to optimize subsequent access times of these files, in order to optimize system performance of the computing device as a whole.

In one embodiment, at least one of the files is periodically moved among the storage devices at regularly scheduled times in accordance with a predetermined schedule. This schedule may be set by a user in advance, for instance, such that subsequent periodic the movement among the storage devices occurs without immediate user initiation at the regularly scheduled times dictated by the schedule. For example, the schedule may specify that the movement among the storage devices should occur on a daily, weekly, or monthly basis. In another embodiment, however, the user may manually initiate the movement among the storage devices. For example, the user may manually run a computer program that results in the movement among the storage devices as has been described.

Furthermore, in one embodiment, once the files have been moved among the storage devices, the number of times each file has been accessed may be reset to zero. As such, the next time the files are moved among the storage devices, the files are moved just based on the number of times the files have been accessed since the most recent time the files were previously moved. By comparison, in a second embodiment, once the files have been moved among the storage devices, the number of times each file has been accessed is specifically not reset to zero. As such, the next time the files are moved among the storage devices, the files are moved based on the number of times the files have been accessed in total, and not just based on the number of times the files have been accessed since the most recent time the files were previously moved.

In still a third embodiment, once the files have been moved among the storage devices, the number of times each file has been accessed may be reduced by division by a predetermined constant. In this embodiment, then, the next time the files are moved among the storage devices, the files are moved based on both the number of times the files have been accessed in total, as well as based on the number of times the files have been accessed since the most recent time the files were previously moved. However, because of the division of the number of times each file has been accessed by a predetermined constant, the next time the files are moved among the storage device, the files are moved based more on the number of times the files have been accessed since the most recent time the files were previously moved, and less on the number of times the files have been access in total.

For example, a given file may be accessed twenty times before the files are moved among the storage devices a first time, and this given file may be accessed another ten times before the files are moved among the storage devices a second time. In the first embodiment noted above, whether the given file is moved among the storage devices the second time is based on the given file having been accessed ten times, whereas in the second embodiment noted above, whether the given file is moved the second time is based on the given file having been accessed twenty times plus ten times, or thirty times. By comparison, in the third embodiment noted above, whether the given file is moved among the storage devices the second time is based on the given file having been accessed twenty times divided by a constant, plus ten times.

Furthermore, in one embodiment, the files are moved among the storage devices based on or in accordance with the caching characteristics regarding each file. For example, files that are frequently cached, and/or that are cached for relatively long periods of time, may not be moved from their home locations to new home locations. System performance is generally not improved much when moving a file's home location from a slower storage device to a faster storage device, even if the file is accessed frequently, if the file is also cached frequently. This is because if a file is cached frequently, then this means that the file will be accessed infrequently from its home location on a non-volatile storage device, and instead its cached version will be frequently accessed from the cache. As such, storage space on faster storage devices is best reserved in this embodiment to files that are not frequently cached.

Description of Particular Embodiment of the Present Disclosure

FIGS. 2A, 2B, and 2C show tables 200, 210, and 220, respectively, that can be used to implement parts 102, 104, and 106, respectively, of the method 100 of FIG. 1, according to a particular embodiment of the present disclosure. The table 200 of FIG. 2A is employed in part 102 of the method 100. The table 210 of FIG. 2B is employed in part 104 of the method 100. The table 220 of FIG. 2C is employed in part 106 of the method 100. It is noted that in varying embodiments, not all the tables 200, 210, and 220 have to be used. For example, in one embodiment, just the table 200 and/or the table 210 may be employed in parts 102 and/104 of the method 100, respectively, and the table 220 may not be employed in part 106 of the method 100.

In FIG. 2A, the table 200 has a number of rows 202A, 202B, ..., 202M, collectively referred to as the rows 202, and a number of columns 204. The rows 202 correspond to the storage devices available to a computing device. For the storage device of each row 202, various storage characteristics of the storage device are maintained, as organized over the columns 204. These storage characteristics can include an identifier, such as a guaranteed-unique identifier (GUID) of the storage device, a name of the device, the storage capacity of the device, the sequential read speed of the device, the sequential write speed of the device, the random-access read speed of the device, and the random-access write speed of the device. It is noted that the identified of the storage device typically does not change, since it uniquely identifies the storage device, regardless of whether, for instance, the name of the storage device changes.

In FIG. 2B, the table 210 has a number of rows 212A, 212B, ..., 212N, collectively referred to as the rows 212, and a number of columns 214. The rows 212 correspond to the files stored on the storage devices available to the computing device. For the file of each row 212, various file characteristics of the file are maintained, as organized over the columns 214. These file characteristics can include an identifier, such as a GUID of the file, a filename of the file, a file size of the file, a read count of the file, and a write count of the file. When a file is accessed, its read count or write count is appropriately incremented depending on whether the file is being read from or written to. The filename and the size of the file may also be updated if the filename or the size of the file changes. The identifier of the file typically does not change, since it uniquely identifies the file, regardless of the storage device on which the file is stored, and regardless of the name of the file.

Figure 3:
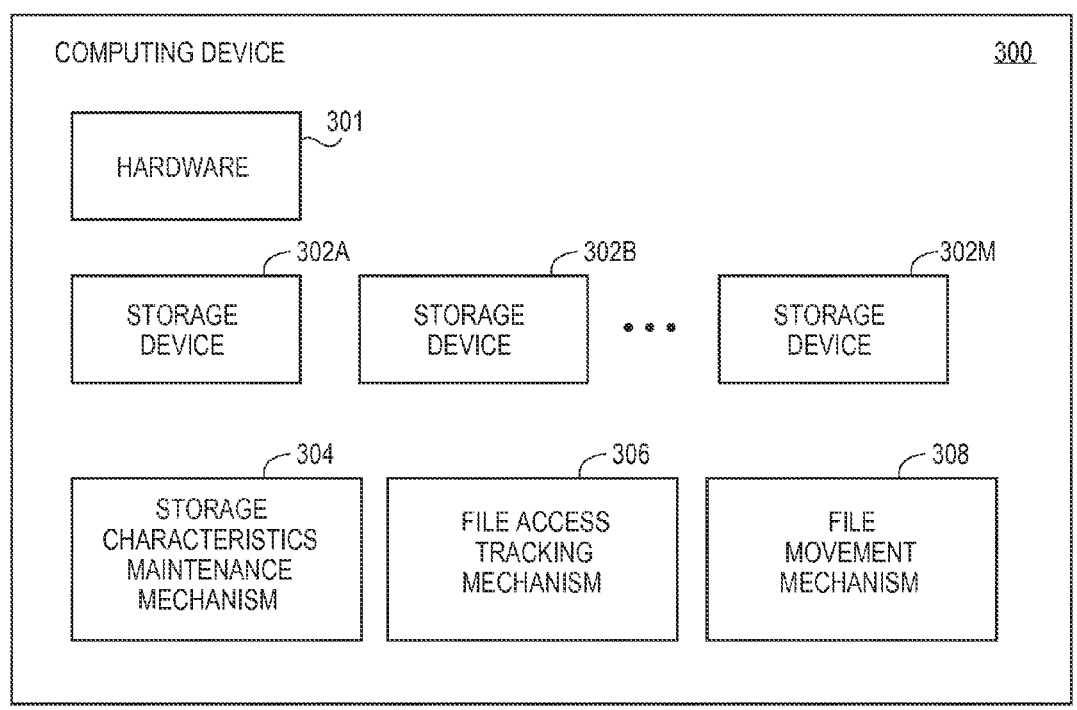
FIG. 3 is a diagram of a representative computing device or computing system, according to an embodiment of the present disclosure.

In FIG. 2C, the table 220 has a number of rows 222A, 222B, ..., 222L, collectively referred to as the rows 222, and a number of columns 224. The rows 222 correspond to conditions governing which files are to be moved to which storage devices, as organized over the columns 224. For example, the row 222A specifies that if a given file has a total number of access counts, equal to the number of read counts plus the number of write counts as stored for the file in the table 210 of FIG. 2B, that is less than A, then the file is moved to the storage device having a particular identifier, corresponding to the storage device having this identifier in the table 200 of FIG. 2A. As another example, the row 222B specifies that if a given file has a total number of access counts less than B (but greater than or equal to A), then the file is moved to the storage device having a particular identifier. In the embodiment of FIG. 2C, then, the total number of access counts of a file dictates the storage device to which the file is moved, Representative Computing Device or Computing System FIG. 3 shows a computing device 300, according to an embodiment of the present disclosure. The computing device 300 may also be referred to more generally as a computing system. The computing device 300 includes hardware 301, as well as storage devices 302A, 302B, ..., 302M, collectively referred to as storage devices 302, and three mechanisms 304, 306, and 308. The hardware 301 includes hardware other than the storage devices 302, such as processors, volatile semiconductor memory, network adapters, and so on. The mechanisms 304, 306, and 308 may each be implemented in hardware (such as the hardware 301), software, or a combination of hardware and software.

One or more of the storage devices 302 may each be a hard disk drive that is locally installed within the computing device 300. One or more other of the storage devices 302 may each be a flash drive that is locally installed within the computing device 300. The storage devices 302 may also include one or more network storage devices, such as hard disk drives that are not locally installed within the computing device 300, but rather are remotely accessible by the computing device 300 over a network. In general, the storage devices 302 share a number of files that are accessed within or by the computing device 300.

The storage devices 302 are physically distinct storage devices. This means that the storage device 302 are each a separate storage device that is physically distinct, or different, from the other storage devices 302. For example, in one embodiment, each storage device is physically encased within its own housing, although in other embodiments, a number of storage devices may still each be physically distinct, or different, while being encased within the same physical housing. In this respect, two or more of the storage devices 302 do not encompass different portions of the same storage device. For example, a storage device can be a physically distinct hard disk drive encased within its own housing. However, it cannot be said that one storage device is one portion of this physically distinct hard drive, and another storage device is another portion of this physically distinct hard drive.

The storage characteristics maintenance mechanism 304 performs part 102 of the method 100 of FIG. 1, and may use the table 200 of FIG. 2A in one embodiment. As such, the mechanism 304 maintains the storage characteristics of the storage devices 302. The access tracking mechanism 306 performs part 104 of the method 100, and may use the table 210 of FIG. 2B in one embodiment. As such, the mechanism 306 tracks the number of times each file stored on the storage devices 302 is accessed. The file movement mechanism 308 performs part 106 of the method 100, and may use the table 220 of FIG. 2C in one embodiment. As such, the mechanism 308 moves the files among the storage devices 302, changing the home locations of these files, based at least on the number of times the files have been accessed, to optimize subsequent access times of the moved files, and thus to optimize system performance of the computing device 300.

It is finally noted that in some embodiments of the present disclosure, a file can be accessed by its same path and filename irrespective of the storage device on which the file is physically stored. For example, logical storage volumes—as compared to physical storage devices—may be represented by letters, such as "c:", "d:", and so on. Each logical storage volume may further be divided into directories, or folders. For example, the primary, or root, directory of a volume may have directories "directory_one" and "directory_two", and the first directory may further have subdirectories "subdirectory_a" and "subdirectory_b". As such, a the can be indicated as being stored in a given subdirectory of a given directory of the logical volume identified by "c:" by the path "c:\directory_one\subdirectory_a".

It is noted in this respect that in some embodiments of the present disclosure, even if the physically distinct storage device on which a given the resides changes, due to performance of part 106 of the method 100 of FIG. 1 for instance, the logical volume containing this file does not change. For example, a the may be physically stored on the storage device 302A, and may be logically stored in a given directory of a given logical volume using the path "c:\directory_one\subdirectory_a". If after performance of the method 100 the file is physically moved so that it is physically stored on the storage device 302B, in such embodiments it is still said that the is logically stored in the given directory of the given logical volume using the path "c:\directory_one\subdirectory_a". As such, from the perspective of a user, the user still accesses the file in question at the logical volume "c:", using the same path "c:\directory_one\subdirectory_a", even though the physical storage device on which the is physically stored has changed.

I claim:

1. A method comprising:
    when each file of a plurality of files is accessed, keeping track of at least a number of times each file has been accessed, where each file is stored on a storage of a plurality of storages; and,
    periodically moving at least one file of the plurality of files among the plurality of storages in accordance with an optimization strategy to optimize subsequent access time of the at least one file,
    wherein the plurality of storages comprises a plurality of physically distinct storage devices, at least one of the storage devices having different storage characteristics as compared to one or more other of the storage devices,
    wherein the optimization strategy is one in which the at least one file that are periodically moved are selected based on ratios of numbers of accesses thereof to file sizes thereof and comprise a first file having a first ratio of a number of accesses of the first file to a file size of the first file and a second file having a second ratio of a number of accesses of the second file to a file size of the second file, the first ratio greater than the second ratio, the first file moved to a third first storage of the plurality of storages having a first access time and a first capacity, the second file moved to a second storage of the plurality of storages having a second access time and a second capacity, the first access time greater than the second access time, the first capacity less than the second capacity.

2. The method of claim 1, further comprising maintaining the storage characteristics of each storage of the plurality of storages.

3. The method of claim 2, wherein maintaining the storage characteristics of each storage of the plurality of storages comprises, for each storage, storing one or more of:
    a sequential read speed of the storage;
    a sequential write speed of the storage;
    a random-access read speed of the storage;
    a random-access write speed of the storage; and,
    a size of the storage.

4. The method of claim 2, wherein periodically moving the plurality of files among the plurality of storages is further based on the storage characteristics of each storage.

5. The method of claim 1, wherein keeping track of at least the number of times each file has been accessed further comprises keeping track of a size of each file that has been accessed, and
    wherein periodically moving the plurality of files among the plurality of storages is further based on the size of each file that has been accessed.

6. The method of claim 1, wherein keeping track of at least the number of times each file has been accessed comprises relying upon an operating system tracking functionality that keeps track of at least the number of times each file has been accessed.

7. The method of claim 1, wherein keeping track of at least the number of times each file has been accessed comprises:
    detecting that a given file of the plurality of files has been accessed; and,
    responsive to detecting that the given file has been accessed, incrementing the number of times that the given file has been accessed.

8. The method of claim 1, wherein keeping track of at least the number of times each file has been accessed comprises keeping track of a number of times each file has been read from and keeping track of a number of times each file has been written to, and
    wherein periodically moving the plurality of files among the plurality of storages is further based on the number of times each file has been read from and the number of times each file has been written to.

9. The method of claim 1, wherein keeping track of at least the number of times each file has been accessed comprises further keeping track of caching characteristics regarding each file, and
    wherein periodically moving the plurality of files among the plurality of storages is further based on the caching characteristics regarding each file.

10. The method of claim 9, wherein the caching characteristics regarding each file comprises one or more of:
    whether each file has been cached;
    whether each file is currently being cached;
    a number of times each file has been cached; and,
    a length of time each file has been cached.

11. The method of claim 1, wherein periodically moving the at least one file of the plurality of files among the plurality of storages comprises moving a sub-plurality of the files that have been accessed a greatest number of times to one or more of the storage devices having fastest access speeds.

12. The method of claim 1, wherein periodically moving the at least one file of the plurality of files among the plurality of storages comprises moving a sub-plurality of the files that have been accessed a greatest number of times to one or more of the storage devices having fastest access speeds, but taking into account sizes of the sub-plurality of the files and sizes of the storage devices so that no one file takes up all storage space on a given storage of the plurality of storages.

13. The method of claim 1, wherein periodically moving the at least one file of the plurality of files among the plurality of storages comprises one or more of:
    periodically moving the at least one file of the plurality of files among the plurality of storages at regularly scheduled times in accordance with a predetermined schedule; and,
    periodically moving the at least one file of the plurality of files among the plurality of storages responsive to manual user initiation.

14. A non-transitory computer-readable medium having a computer program stored thereon for execution by one or more processors, such that execution of the computer program by the processors from the computer-readable medium causes the computer program to perform a method comprising:
    when each file of a plurality of files is accessed, keeping track of at least a number of times each file has been accessed, where each file is stored on a storage of a plurality of storages; and,
    periodically moving at least one file of the plurality of files among the plurality of storages in accordance with an optimization strategy to optimize subsequent access time of the at least one file,
    wherein the plurality of storages comprises a plurality of physically distinct storage devices, at least one of the storage devices having different storage characteristics as compared to one or more other of the storage devices,
    wherein the optimization strategy is one in which the at least one file that are periodically moved are selected based on ratios of numbers of accesses thereof to file sizes thereof and comprise a first file having a first ratio of a number of accesses of the first file to a file size of the first file and a second file having a second ratio of a number of accesses of the second file to a file size of the second file, the first ratio greater than the second ratio, the first file moved to a first storage of the plurality of storages having a first access time and a first capacity, the second file moved to a second storage of the plurality of storages having a second access time and a second capacity, the first access time greater than the second access time, the first capacity less than the second capacity.

15. A computing system comprising:

a plurality of storages comprising a plurality of physically distinct storage devices, at least one of the storage devices having different storage characteristics as compared to one or more other of the storage devices, the plurality of storages storing a plurality of files that are accessed; and, a mechanism to periodically move at least one file of the plurality of files among the plurality of storages in accordance with an optimization strategy to optimize subsequent access time of the at least one file, wherein the optimization strategy is one in which the at least one file that are periodically moved are selected based on ratios of numbers of accesses thereof to file sizes thereof and comprise a first file having a first ratio of a number of accesses of the first file to a file size of the first file and a second file having a second ratio of a number of accesses of the second file to a file size of the second file, the first ratio greater than the second ratio, the first file moved to a first storage of the plurality of storages having a first access time and a first capacity, the second file moved to a second storage of the plurality of storages having a second access time and a second capacity, the first access time greater than the second access time, the first capacity less than the second capacity.

* * * * *

UNITED STATES PATENT AND TRADEMARK OFFICE
CERTIFICATE OF CORRECTION

| | | |
|---|---|---|
| PATENT NO. | : 8,533,183 B2 | |
| APPLICATION NO. | : 13/203978 | |
| DATED | : September 10, 2013 | |
| INVENTOR(S) | : Mark K. Hokanson | |

It is certified that error appears in the above-identified patent and that said Letters Patent is hereby corrected as shown below:

In the Claims:

In column 9, line 28, in Claim 1, after "to a" delete "third".

Signed and Sealed this
Fifth Day of November, 2013

Teresa Stanek Rea
*Deputy Director of the United States Patent and Trademark Office*